(12) United States Patent
Gunn

(10) Patent No.: US 7,854,359 B2
(45) Date of Patent: Dec. 21, 2010

(54) QUICK CONNECT SYSTEM FOR A BICYCLE RACK ASSEMBLY

(75) Inventor: George Gunn, Livonia, MI (US)

(73) Assignee: Midwest Bus Corporation, Owosso, MI (US)

( * ) Notice: Subject to any disclaimer, the term of this patent is extended or adjusted under 35 U.S.C. 154(b) by 1134 days.

(21) Appl. No.: 11/520,075

(22) Filed: Sep. 13, 2006

(65) Prior Publication Data

US 2007/0251964 A1 Nov. 1, 2007

Related U.S. Application Data

(60) Provisional application No. 60/796,495, filed on May 1, 2006.

(51) Int. Cl.
*B60R 9/00* (2006.01)
*F16B 21/00* (2006.01)
*F16B 21/14* (2006.01)

(52) U.S. Cl. .................. 224/504; 224/505; 224/506; 224/507; 224/512; 224/924; 411/349; 411/549; 411/553; 411/513

(58) Field of Classification Search .................. 224/504, 224/506, 505, 507, 509, 511, 512, 525, 533, 224/536, 537, 324, 924; 411/349, 549, 553, 411/513; 211/19, 20, 21, 23, 24; 410/19, 410/20
See application file for complete search history.

(56) References Cited

U.S. PATENT DOCUMENTS

| 556,789 A | 3/1896 | Walker |
|---|---|---|
| 576,351 A | 2/1897 | Penfield |
| 607,024 A | 7/1898 | Durfee et al. |
| 615,264 A | 12/1898 | Du Pont |
| 1,522,339 A | 1/1925 | Specht |
| 3,116,836 A | 1/1964 | McCauley |
| 3,355,028 A | 11/1967 | Mork |
| 3,367,548 A | 2/1968 | Cooper |
| 3,510,146 A | 5/1970 | Hartman |
| 3,529,737 A | 9/1970 | Daugherty |

(Continued)

FOREIGN PATENT DOCUMENTS

SE    104714    6/1942

*Primary Examiner*—Nathan J Newhouse
*Assistant Examiner*—Lester L Vanterpool
(74) *Attorney, Agent, or Firm*—Young Basile

(57) ABSTRACT

A quick connect assembly for mounting a bicycle rack to a vehicle bumper includes a mounting bracket securely connectable to the bumper and a pivoting arm integrally connected to the bicycle rack and mountable to the mounting bracket. The mounting bracket has a horizontal base member and a vertical wall extending from the rear edge of the base member. Along each lateral edge of the base member is a vertical side wall having through apertures for receiving portions of the pivoting arm. A latch plate is centrally located on the mounting bracket between the two side walls. The latch plate has notches formed therein for receiving a latch pin of the pivoting arm to hold the bicycle rack in the vertically upward position or the horizontal working position. An arcuate cam formation separates the notches. The pivoting arm has spaced side plates each having a side extending peg for disposition in the apertures of the side walls. One peg has locking tabs and the other peg has a through aperture for receiving a cotterpin to secure the pivoting arm to the mounting bracket when the latch pin is in one of the notches.

3 Claims, 2 Drawing Sheets

U.S. PATENT DOCUMENTS

| | | |
|---|---|---|
| 3,744,689 A | 7/1973 | Kjensmo |
| 3,861,533 A | 1/1975 | Radek |
| 3,921,842 A | 11/1975 | Campbell |
| 4,125,214 A | 11/1978 | Penn .................. 224/42.08 |
| 4,171,077 A | 10/1979 | Richard, Jr. |
| 4,204,701 A | 5/1980 | Oltrogge |
| 4,213,729 A | 7/1980 | Cowles et al. |
| 4,360,135 A | 11/1982 | Goble |
| 4,392,572 A | 7/1983 | Bernard |
| 4,403,716 A | 9/1983 | Carlson et al. |
| 4,413,761 A | 11/1983 | Angel ................ 224/42.45 R |
| 4,437,597 A | 3/1984 | Doyle |
| 4,524,893 A | 6/1985 | Cole |
| 4,607,858 A | 8/1986 | Wagner |
| 4,702,401 A | 10/1987 | Graber et al. |
| 4,815,638 A | 3/1989 | Hutyra |
| 4,823,997 A | 4/1989 | Krieger |
| 4,875,608 A | 10/1989 | Graber |
| 5,022,649 A | 6/1991 | Traub et al. |
| 5,029,740 A | 7/1991 | Cox |
| 5,094,469 A | 3/1992 | Yamamoto |
| 5,154,462 A | 10/1992 | Carpenter |
| 5,169,042 A | 12/1992 | Ching |
| 5,236,342 A | 8/1993 | Pellettier |
| 5,238,125 A | 8/1993 | Smith |
| 5,246,120 A | 9/1993 | Walker |
| 5,269,446 A | 12/1993 | Biehn |
| 5,360,151 A | 11/1994 | Fine |
| 5,522,530 A | 6/1996 | Boettcher |
| 5,549,231 A | 8/1996 | Fletcher et al. |
| 5,579,973 A | 12/1996 | Taft |
| 5,685,469 A | 11/1997 | Stapleton |
| 5,690,259 A | 11/1997 | Montani |
| 5,692,659 A | 12/1997 | Reeves |
| 5,755,454 A | 5/1998 | Peterson |
| 5,775,560 A | 7/1998 | Zahn et al. .................. 224/524 |
| 5,794,828 A | 8/1998 | Colan et al. |
| 5,833,074 A | 11/1998 | Phillips |
| 5,836,493 A | 11/1998 | Grunsted et al. |
| 5,941,397 A | 8/1999 | Buchanan et al. |
| 5,944,198 A | 8/1999 | Ihalainen |
| 5,950,973 A | 9/1999 | Verma |
| 5,984,111 A | 11/1999 | Pennella |
| 5,996,870 A | 12/1999 | Shaver |
| 6,047,869 A | 4/2000 | Chiu |
| 6,050,426 A | 4/2000 | Leurdijk |
| 6,053,336 A | 4/2000 | Reeves |
| 6,065,766 A * | 5/2000 | Pulliam ................... 280/415.1 |
| 6,089,430 A | 7/2000 | Mehls |
| 6,092,706 A | 7/2000 | Bogan |
| 6,095,387 A | 8/2000 | Lipscomb |
| 6,244,483 B1 | 6/2001 | McLemore et al. |
| 6,398,275 B1 | 6/2002 | Hartel et al. |
| 6,511,250 B2 | 1/2003 | Lindsay |
| 6,709,036 B1 | 3/2004 | Evans |
| 6,968,986 B1 * | 11/2005 | Lloyd et al. ................. 224/507 |
| 6,976,615 B2 | 12/2005 | Dean .......................... 224/405 |
| 7,410,082 B2 * | 8/2008 | Stewart ....................... 224/504 |
| 2005/0056672 A1 | 3/2005 | Stewart ....................... 224/504 |

* cited by examiner

QUICK CONNECT SYSTEM FOR A BICYCLE RACK ASSEMBLY

This application claims priority of provisional patent application Ser. No. 60/796,495 filed on May 1, 2006, herein incorporated in its entirety by reference.

BACKGROUND OF THE INVENTION

This invention relates to a motor vehicle bicycle rack assembly. Bicycle carriers for connection to a vehicle exterior bumper are well known. A common type of bicycle carrier attaches to a vehicle's hitch for support thereon. These hitch-type bicycle carriers do not allow for pivotal movement for placement of the bicycle carrier in either the stored position or the working position. Therefore, when the bicycle carrier is not in use, the carrier must be removed or it will extend unattractively beyond the bumper Other types of bicycle carriers may include pivotal movement. However, these carriers are generally mounted on the vehicle bumper in a semi-permanent manner by bolts. This semi-permanent mounting can make access to the engine compartment, trunk or tailgate inconvenient or prohibitive. Therefore, it is desirable that a bicycle carrier is available having a quick-connection to the bumper or to a bracket secured to the bumper, wherein the bracket does not interfere with access to the engine compartment, trunk or tailgate.

SUMMARY OF THE INVENTION

The invention relates to a quick connection and release assembly for a bicycle rack onto a bumper system. The assembly includes a bracket mounted onto the bumper and the bicycle rack releasably connectable to the bracket with a quick connection. The bicycle rack is moveable relative to the bracket between a working position extending generally forward of the bumper system and a stowed position extending generally vertically upwardly from the bumper. The bracket has a rear planar wall having through apertures for receiving bolts to mount to the bumper system of the vehicle. The bracket further has a pair of side walls extending from distal ends of the rear planar wall and a latch plate extending from a center portion of the rear planar wall. The side walls have releasably mounting means for the bicycle rack.

In one aspect, the latch plate of the assembly has an exposed edge defining a pair of angularly spaced detents interconnected by an arcuate cam surface for coacting with a portion of the bicycle rack for maintaining the rack in one of the working position and the stowed position.

In another aspect, the pair of side walls each have coaxially placed through apertures for receiving portion of the bicycle rack. One of the apertures in the side walls has an extending cutout offset from the pair of angularly spaced detents in the latch plate.

In yet another aspect, the bicycle rack has a pair of end plates spaced from each other at a distance to correspond to the pair of side walls. The side walls each have a peg extending therefrom. Each of the pegs are orientated in the same direction for a single lateral motion for assembly of the bicycle rack onto the bracket.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
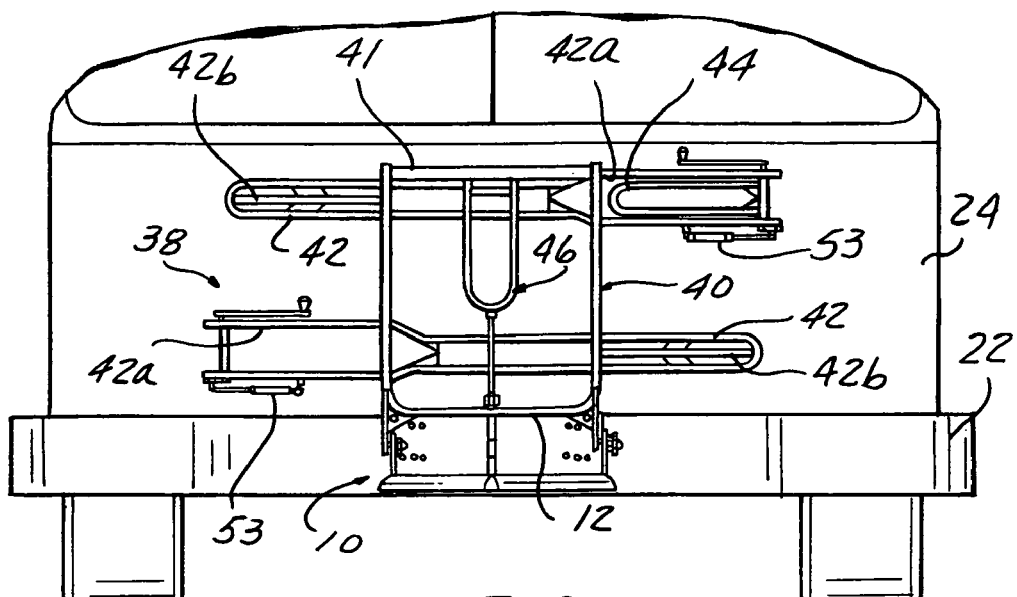
FIG. 1 is an elevational view showing a bicycle rack in a raised upwardly extending stowed position on a bumper of a vehicle, the bicycle rack having a mounting bracket and a quick connection and release assembly.

Referring to FIGS. 1-5, a quick connection and release assembly is provided for a bicycle rack onto a bumper system 22 of a vehicle 24 including two main components of a mounting bracket 10 and a pivoting arm 12. The mounting bracket 10 has a horizontal base member 14 and a rear vertical planar wall 16 attached along a rear lower edge 15 to the base member 14. The rear vertical wall has a plurality of apertures 18 therethrough for receiving bolts 20 for secure attachment to the vehicle bumper 22. Similar apertures (not shown) must be positioned in the bumper 22 for receiving the bolts 20.

The base member 14 may be made of a metal material. However, the base member 14 may also be formed or coated with a suitable rubberized material such as urethane or neopreen having similar attributes of the bumper 22, since the base member 14 extends beyond the bumper 22.

Extending from the rear planar walls along each lateral edge 26 of the base member 14 is a side wall 28a, 28b. Each of the side walls 28a, 28b has a through aperture 30a, 30b respectively, coaxial to each other for connection to the pivoting arm 12. Aperture 30a in side wall 28a has an irregular formation for reasons discussed hereinafter.

Figure 3:
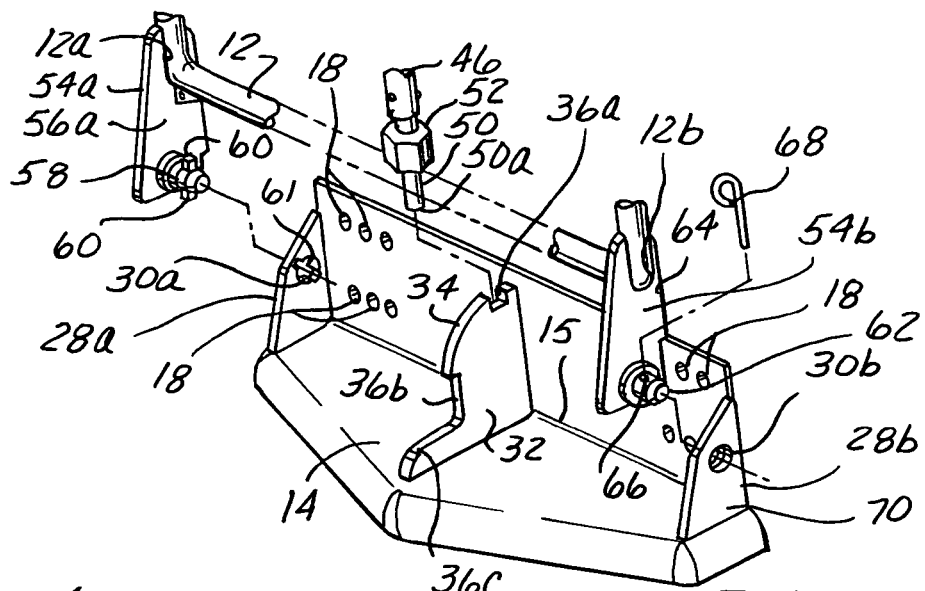
FIG. 3 is an exploded view of the quick connection and release assembly for the bicycle rack including the mounting bracket and a pivot arm.

A latch plate 32 is centrally disposed between the side walls 28a, 28b. The latch plate 32 is securely attached to both the base member 14 and the rear vertical wall 16. The latch plate 32 has an exposed arcuate edge forming a cam surface 34 and having a pair of notches 36a, 36b formed therein. The upper notch 36a is positioned for securing the bicycle rack 38 in the upward and stowed position. The lower notch 36b is positioned for securing the bicycle rack 38 in the forwardly extended position. As can be seen in FIG. 3, the lower notch 36b has a greater surface area than the upper notch 3ba to allow for moderate movement of the bicycle rack to compensate for various road surfaces when traveling with bicycles locked onto the bicycle rack 38. As also can be seen in FIG. 3, the configuration of the lower notch 36b provides for slight fore and aft movement of the bicycle rack along the extended ledge portion 36c of notch 36b.

Figure 2:
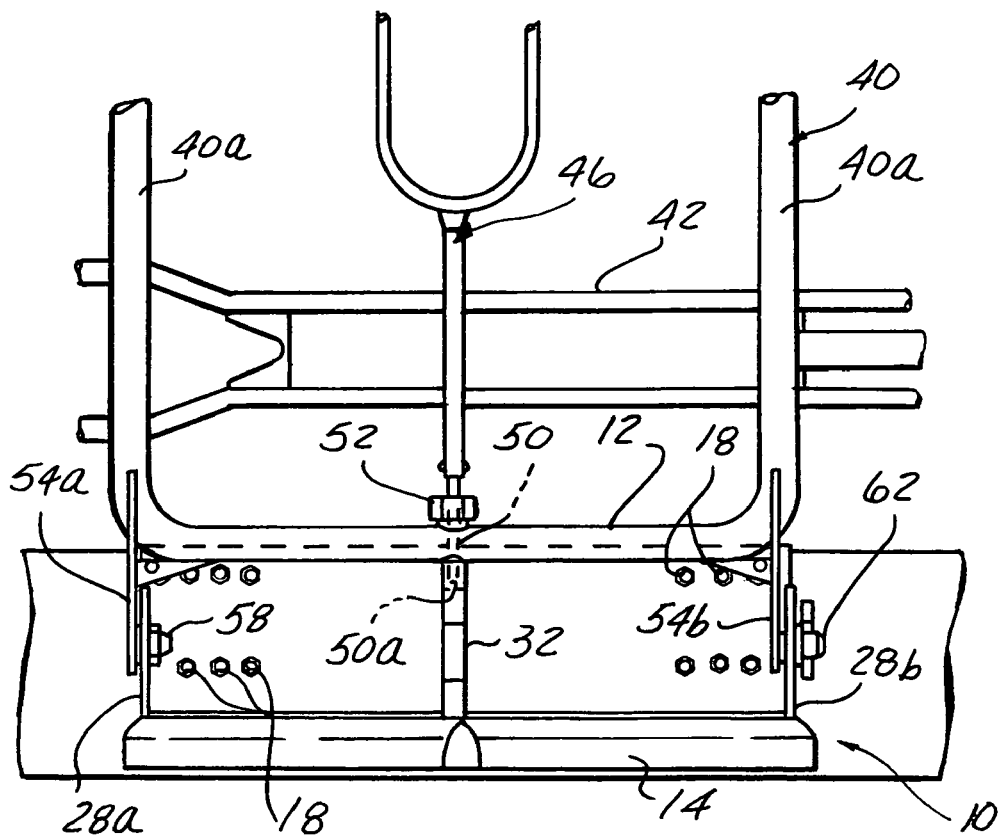
FIG. 2 is an elevational view of the bicycle rack in FIG. 1 illustrating certain features of the mounting bracket connected to the bumper of the vehicle.

The bicycle rack 38 can have various configurations. In one aspect, the bicycle rack 38 can be configured as shown in FIGS. 1 and 2. In this aspect the bicycle rack 38 has a tubular construction and includes a main frame 40, cradles or carriers 42, lock arms 44 and a latch mechanism 46. The latch mechanism 46 connects to the pivoting arm 12 that coacts with the mounting bracket 10.

Each cradle 42 accommodates a single bicycle and specifically defines a relatively short first or front well 42a to receive the front wheel of a bicycle and a relatively long second or rear well 42b to receive the back wheel of the bicycle. The front and rear cradles 42 are preferably reversed on adjacent cradles 42 so that the short front wheel well of the front cradle confronts the long rear wheel well of the rear cradle and the long rear wheel well of the front cradle confronts the short front wheel well of the rear cradle.

A pivotal lock arm 44 is associated with each cradle. FIG. 1 illustrates only one lock arm 44. Following placement of a bicycle in a cradle 42, the respective lock arm 44 is pivoted upwardly into grasping relationship with respect to the front wheel or rear wheel of the bicycle. An air spring 53 may be associated with each lock arm 44 to serve to maintain a lock arm 44 in tight engaging relationship with the bicycle wheel to preclude displacement of the bicycle from the respective cradle.

The main frame 40 generally has a rectangular tubular configuration including side rails 40a, an upper end rail 41 and a lower end rail, which is also the pivoting arm 12. Therefore the pivoting arm 12 is connected or integrally formed with the main frame 40.

The latch mechanism 46 has one end connected to upper end rail 41 and a second end terminating at the pivoting arm 12. A latch finger 50 interconnects the latch mechanism 46 and the pivoting atm 12. The latch finger 50 extends through the pivoting atm 12 for coacting with the latch plate 32. The latch finger 50 slides through a boss 52 which provides a guide to position the free end 50a for coacting with the latch plate 32.

The lateral ends 12a, 12b of the pivoting arm 12 which may terminate into the side rails 40a of the main frame 40 have connecting side plates 54a, 54b attached thereto. The connecting plates, 54a, 54b are situated or connected to the pivoting arm 12 so that when the pivoting arm 12 is connected to the mounting bracket 10, the side plates 54a, 54b are parallel and adjacent to the respective side walls 28a, 28b. The side plates 54a, 54b are also spaced from each other by the pivoting arm 12 so that one of the side plates 54a, 54b is adjacent to an exterior side of one of the side walls 28a or 28b and the other side plate 54a or 54b is adjacent to an interior surface of the other side wall 28a or 28b when the bicycle rack is mounted onto the mounting bracket 10, as shown in FIGS. 3-5.

Figure 4:
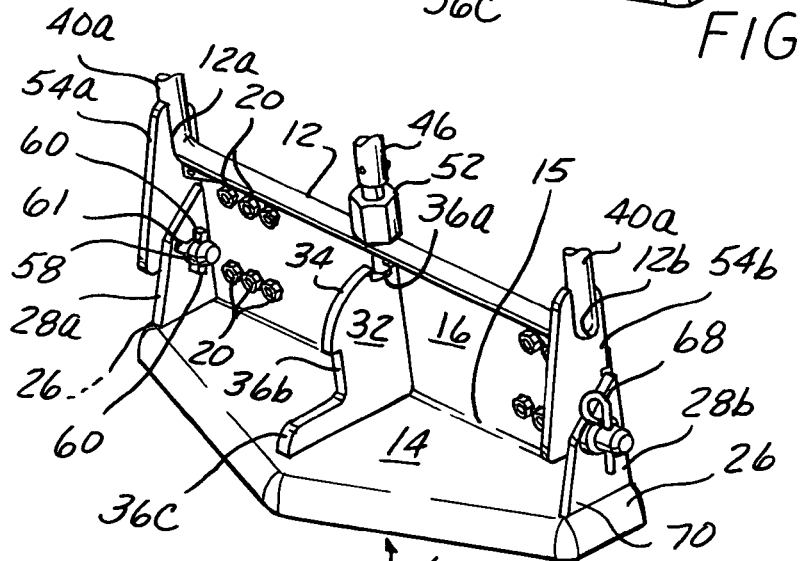
FIG. 4 is a perspective view showing the quick connection and release assembly in a raised upwardly extending stowed position.
Figure 5:
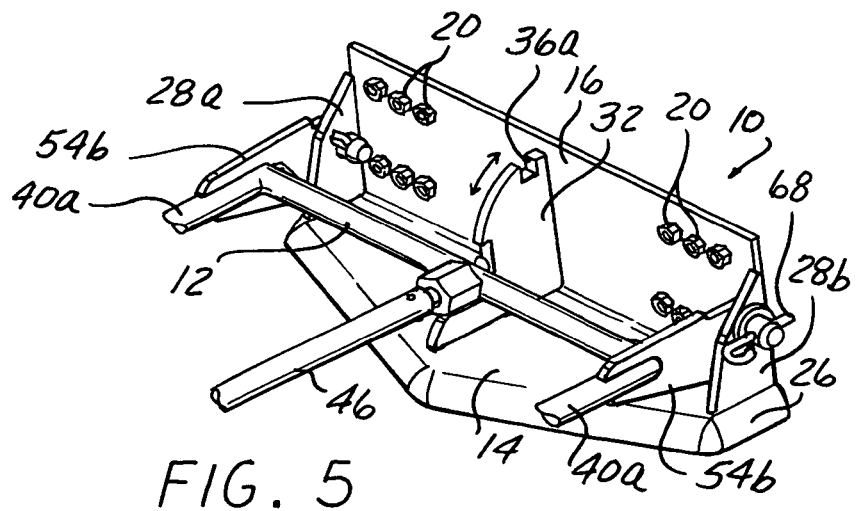
FIG. 5 is a perspective view showing the assembly in a forwardly extending position.

In the embodiment shown in FIGS. 3-5, the inner surface 56a of side plate 54a has a circular peg 58 extending therefrom. The circular peg 58 has at least one tab 60 laterally extending from the peg 58. In the illustration shown in FIGS. 3-5, there are two tabs 60 extending from the peg 58. The through aperture 30a in side wall 28a has cutouts 61 for a complementary configuration for receiving the peg 58 and its associated tabs 60 therethrough. The tabs 60 can be aligned with the cutouts 61 through aperture 30a only when the free end 50a of the latch finger 50 is positioned for placement on the arcuate cam surface 34 of the latch plate 32. When free end 50a of the latch finger 50 is located in one of the notches 36a or 36b, the tabs 60 are offset from the cutouts 61 located in through aperture 30a to prevent slippage of the bicycle rack from the mounting bracket 10 when the latch finger 50 is in either the vertical stowed position or horizontal working position.

Another circular peg 62 is positioned on an outside surface 64 of the side plate 54b. The circular peg 62 is coaxial with the peg 58 and is sized for disposition through the aperture 30b. The circular peg 62 has a through aperture 66 for receiving a cotterpin 68 once the through aperture 66 on peg 62 has extended to the outside surface 70 of the side wall 28b. The cotterpin 68 secures the connection between the side plate 54b and the mounting bracket 10.

FIGS. 4 and 5 show the pivoting arm 12 connected to the mounting bracket 10 with the cotterpin 68 installed in aperture 66 and tab 60 offset in aperture 30a.

In one aspect a squeezing force on the latch mechanism 46 of the bicycle rack 38 releases the free end 50a of the latch finger 50 from the engaged notches 36a or 36b. The force on the latch mechanism may work against a resistance of a spring (not shown) wherein the pivoting arm 12 and the bicycle rack can be moved to an alternate position with the free end 50a of the latch finger 50 guiding along the arcuate cam surface 30 under the urging of the spring until the other notch 36a or 36b is reached and engaged.

In the present invention a bicycle rack can be easily and selectively installed on a vehicle bumper via the mounting bracket 10 fixed to the vehicle bumper 22 with bolts 20. To install the bicycle rack 38, the pegs 58 and 62 on the side plates 54a, 54b are aligned with through apertures 30a and 30b, respectively. A lateral motion by the user installs the pegs 58, 62 within the associated apertures 30a, 30b. The cotterpin 68 secures peg 62 into aperture 30b. Peg 58 is aligned with the aperture 30a so that tabs 60 are aligned with cutouts 61. Rotational movement of the pivoting arm secures peg 58 into aperture 30a to offset the tabs 60 from the complementary cutouts 61. When the bicycle rack 38 is installed, the latch finger 50 rides on arcuate cam 34. The position of the bicycle rack 38 is selectively held in either the stored position or forwardly extended position by placement of the latch finger 50 in upper or lower notch 36a, 36b respectively.

To remove the bicycle rack 38 from the mounting bracket, the cotterpin 68 is removed and the tabs 60 are aligned with the cutouts 61 in aperture 30a to laterally move the bicycle rack 38 in the opposite direction to remove the rack 38 from the mounting bracket 10. The mounting bracket 10 may permanently remain on the bumper to coact with the existing bumper 22.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. For example, the bicycle rack 38 may have various configurations for securing the bicycle wheels to the bicycle rack 38. The location and configuration of the latching mechanism and the use of the air spring 53 may also be altered.

What is claimed is:

1. A quick connection and release assembly for a bicycle rack onto a bumper system of a vehicle comprising:
   a bracket mountable on the bumper system; and
   a bicycle rack releasably connectable to the bracket and configured to be at least one of installed to and uninstalled from the bracket without the use of a tool, the bicycle rack moveable relative to the bracket between a working position extending generally forwardly of the bumper system and a stowed position extending generally vertically upwardly from the bumper system,
   said bracket having a rear planar wall having through apertures for receiving bolts to mount to the bumper system, said bracket further having a pair of side walls extending from distal ends of the rear planar wall and a latch plate extending from a center portion of the rear planar wall, said side walls having releasably mounting means for the bicycle rack, wherein the bicycle rack has a pair of end plates spaced from each other at a distance to correspond to the pair of side walls, wherein the releasably mounting means includes a through aperture coaxially formed in each side wall and pegs extending from each of the end plates, said pegs configured for disposition through the through apertures, wherein each peg extends from its respective end plate in the same direction, wherein the bicycle rack has a rod extending between and connecting each end plate, wherein a latch pin extends from the rod, said latch pin cooperating with the latch plate for securing the bicycle rack in one of the working position and the stowed position, wherein the latch plate has an exposed edge defining a pair of angularly spaced notches interconnected by an arcuate earn surface for eoacting with the pin on the bicycle rake for maintaining the rack in one of the working position and the stowed position, and wherein the tab on the peg is only aligned with the cut out when the pin is aligned on the arcuate cam surface.

2. The assembly of claim 1, wherein the other peg has a through aperture therein for receiving a cotterpin therein.

3. A quick connection and release assembly for a bicycle rack onto a bumper system comprising:

a bracket having a horizontal base member and a rear vertical plate second to the base member along a rear edge of the base member, a side plate extending from each lateral edge of the rear vertical plate and a centrally positioned latch plate disposed between each side plate, said latch plate having a pair of notches formed therein, wherein said notches are spaced by an arcuate cam formation, said side plates have coaxial apertures formed therein, wherein one coaxial aperture has cutout notches; and a pivotal arm integrally connected with the bicycle rack, said pivotal aim having first and second connecting plates spaced on the pivotal arm for corresponding to the side plates, the first connecting plate having a peg extending from an inner wall thereof, said peg having tabs extending therefrom for aligning with the cutout notches during assembly, the second connecting plate having another peg extending from an exterior wall thereof, wherein said other peg has means for receiving a cotterpin, wherein said pivotal arm further includes a centrally located latch pin for coaching with said latch plate, and wherein the pivotal aim is only releasable from the bracket when the latch pin is positioned on the arcuate cam formation.

* * * * *